United States Patent
Gomar et al.

(10) Patent No.: US 9,685,159 B2
(45) Date of Patent: *Jun. 20, 2017

(54) SPEAKER RECOGNITION FROM TELEPHONE CALLS

(71) Applicant: Agnitio SL, Madrid (ES)

(72) Inventors: Marta Garcia Gomar, Madrid (ES); Johan Nikolaas Langehoven Brummer, Madrid (ES); Luis Buera Rodriguez, Madrid (ES)

(73) Assignee: Agnitio SL, Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,182

(22) Filed: Aug. 3, 2015

(65) Prior Publication Data

US 2015/0340039 A1    Nov. 26, 2015

Related U.S. Application Data

(63) Continuation-in-part of application No. 14/720,716, filed on May 22, 2015, now abandoned, which is a continuation-in-part of application No. 13/509,606, filed as application No. PCT/EP2009/008063 on Nov. 12, 2009, now Pat. No. 9,043,207.

(51) Int. Cl.

| | |
|---|---|
| *G10L 17/00* | (2013.01) |
| *G10L 17/02* | (2013.01) |
| *G10L 17/06* | (2013.01) |
| *H04M 3/22* | (2006.01) |
| *H04M 3/436* | (2006.01) |

(52) U.S. Cl.
CPC .............. *G10L 17/00* (2013.01); *G10L 17/02* (2013.01); *G10L 17/06* (2013.01); *H04M 3/2281* (2013.01); *H04M 3/436* (2013.01); *H04M 2201/405* (2013.01); *H04M 2201/41* (2013.01)

(58) Field of Classification Search
CPC ....... G10L 17/00; G10L 17/005; G10L 17/02; G10L 17/04; G10L 17/06; G10L 17/08; G10L 17/14; G10L 17/16; G10L 17/20
USPC .......................... 704/239, 246, 248, 249, 250
See application file for complete search history.

(56) References Cited

U.S. PATENT DOCUMENTS

| | | | |
|---|---|---|---|
| 6,697,778 B1 * | 2/2004 | Kuhn ...................... | G10L 17/02 704/243 |
| 7,295,970 B1 * | 11/2007 | Gorin ...................... | G10L 17/12 704/221 |
| 2009/0043573 A1 * | 2/2009 | Weinberg ............... | H04L 63/302 704/223 |

* cited by examiner

*Primary Examiner* — Qi Han
(74) *Attorney, Agent, or Firm* — Galvin Patent Law LLC; Brian R. Galvin

(57) ABSTRACT

A method for speaker recognition comprising: obtaining speaker information for a target speaker; obtaining speech samples from telephone calls from an unknown speaker; classifying the speech samples according the unknown speaker thereby providing speaker-dependent classes of speech samples; extracting speaker information of each of the speaker-dependent classes of speech samples; combining the extracted speaker information; comparing the combined extracted speaker information with the stored speaker information for the target speaker to obtain a comparison result; and determining whether the unknown speaker is identical with the target speaker based on the comparison result.

15 Claims, 5 Drawing Sheets

SPEAKER RECOGNITION FROM TELEPHONE CALLS

RELATED APPLICATIONS

This application is a continuation-in-part of U.S. application Ser. No. 14/720,716 titled "SPEAKER RECOGNITION FROM TELEPHONE CALLS", filed on May 22, 2015, which is a continuation of U.S. application Ser. No. 13/509,606 titled "SPEAKER RECOGNITION FROM TELEPHONE CALLS", filed on May 12, 2012, which is the national stage entry of and claims priority to PCT patent application serial number PCT/EP2009/008063, titled, "SPEAKER RECOGNITION FROM TELEPHONE CALLS", which was filed on Nov. 12, 2009, the entire specifications of each of which are incorporated herewith by reference in its entirety.

BACKGROUND OF THE INVENTION

Field of the Invention

The present invention relates to the art of automatic speaker recognition and, in particular, speaker identification from incoming telephone calls.

Speaker recognition plays an important role in the context of intelligence investigations during which a huge number of telephone calls is to be analyzed with respect to the speaker's identity. For example, a particular at least one target speaker is tracked based on a set of speech samples obtained for the at least one target speaker during telephone calls in the past. According to another example, screening of incoming telephone calls is performed in order to alert staff when a known speaker was on the line. Speaker Identification may be requested for a number of different criminal offences, such as making hoax emergency calls to the police, ambulance or fire brigade, making threatening or harassing telephone calls, blackmail or extortion demands, taking part in criminal conspiracies, etc.

Conventionally, a new speech sample of an unknown speaker of a new incoming telephone call is analyzed in order to determine whether or not the speech sample matches other samples of already identified speakers. It is determined whether the new speech sample matches on or more known ones to a predetermined degree defined in terms of some distance measure or similarity metrics.

For example, Gaussian Mixture Model metrics can be employed to determine whether a Gaussian Mixture Model derived for the new speech sample of the unknown speaker has a distance to Gaussian Mixture Models derived for already identified known speakers below some predetermined threshold. Particularly, the well-known Kullback-Leibler distance can be used.

However, automatic speaker identification still is a demanding task, since the reliability of the methods for speaker recognition in telephone calls is not considered sufficient and still prove error-prone with respect to the confusion of unknown speakers with know ones.

Thus, it is an object of the present invention to provide a method for speaker recognition in telephone calls with improved accuracy as compared to the art.

SUMMARY OF THE INVENTION

In view of the above, the present invention provides a method for speaker recognition according to claim 1. This method comprises the steps of:

obtaining and storing speaker information for at least one target speaker;

obtaining a plurality of speech samples from a plurality of telephone calls from at least one unknown speaker (that may or may not be different from the at least one target speaker);

classifying the speech samples according to the at least one unknown speaker thereby providing one, two or more speaker-dependent classes of speech samples (one single class for each of the unknown speakers);

extracting speaker information of speech samples of each of the speaker-dependent classes of speech samples;

combining the extracted speaker information for each of the speaker-dependent classes of speech samples (to obtain for each class combined extracted speaker information);

comparing the combined extracted speaker information for each of the speaker dependent classes of speech samples with the stored speaker information for the at least one target speaker to obtain at least one comparison result; and determining whether one of the at least one unknown speakers is identical with the at least one target speaker based on the at least one comparison result.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 1 provides a process flow diagram of a method according to a preferred embodiment of the invention.

DETAILED DESCRIPTION

Figure 1:
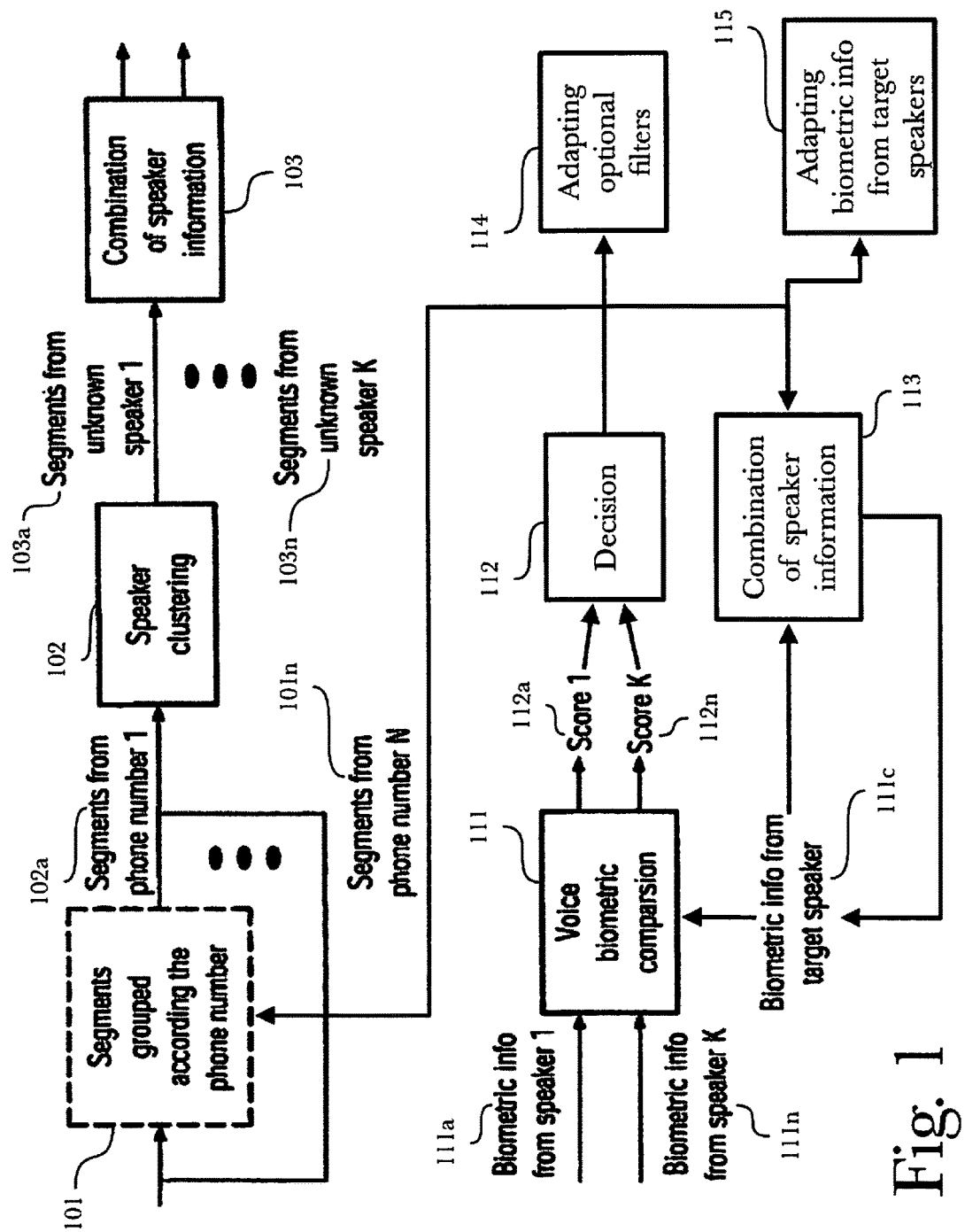

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 2:
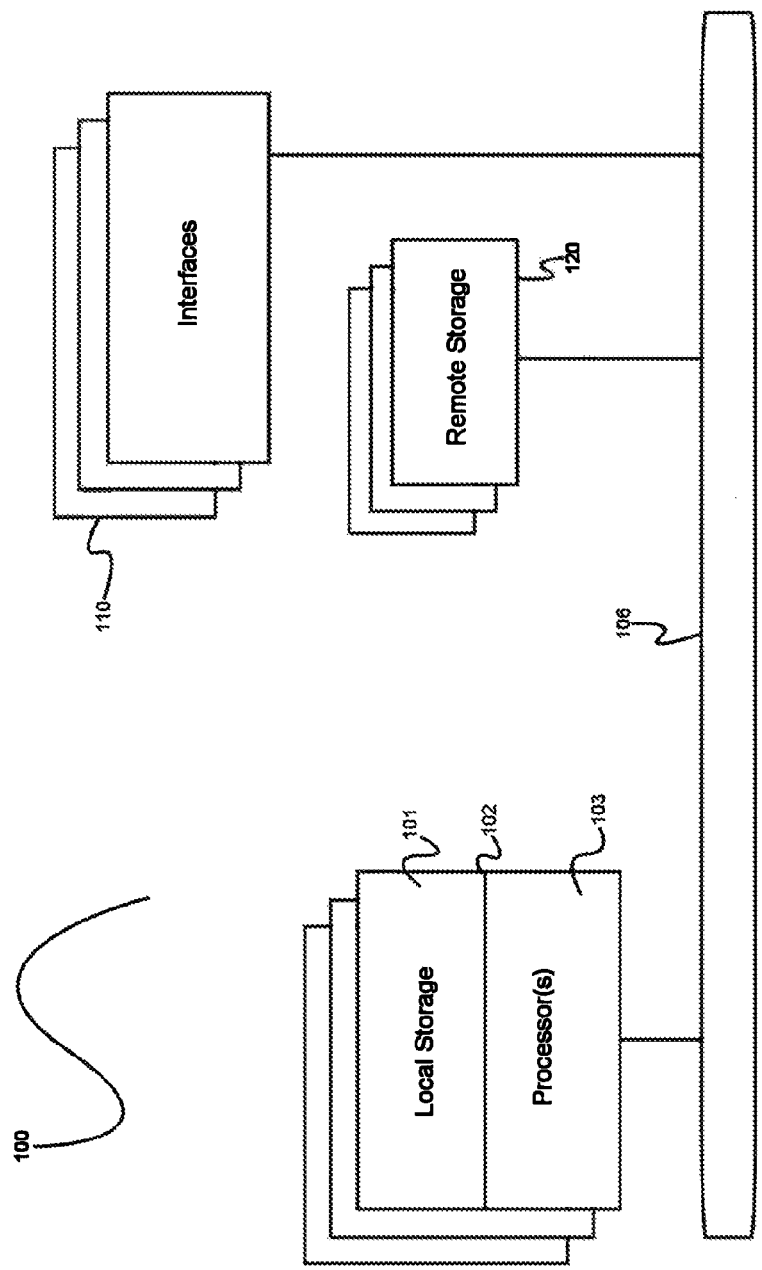
FIG. 2 is a block diagram illustrating an exemplary hardware architecture of a computing device used in an embodiment of the invention.

Referring now to FIG. 2, there is shown a block diagram depicting an exemplary computing device 200 suitable for implementing at least a portion of the features or functionalities disclosed herein. Computing device 200 may be, for example, any one of the computing machines listed in the previous paragraph, or indeed any other electronic device capable of executing software- or hardware-based instructions according to one or more programs stored in memory. Computing device 200 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 200 includes one or more central processing units (CPU) 202, one or more interfaces 210, and one or more busses 206 (such as a peripheral component interconnect (PCI) bus). When acting under the control of appropriate software or firmware, CPU 202 may be responsible for implementing specific functions associated with the functions of a specifically configured computing device or machine. For example, in at least one embodiment, a computing device 200 may be configured or designed to function as a server system utilizing CPU 202, local memory 201 and/or remote memory 220, and interface (s) 210. In at least one embodiment, CPU 202 may be caused to perform one or more of the different types of functions and/or operations under the control of software modules or components, which for example, may include an operating system and any appropriate applications software, drivers, and the like.

CPU 202 may include one or more processors 203 such as, for example, a processor from one of the Intel, ARM, Qualcomm, and AMD families of microprocessors. In some embodiments, processors 203 may include specially designed hardware such as application-specific integrated circuits (ASICs), electrically erasable programmable read-only memories (EEPROMs), field-programmable gate arrays (FPGAs), and so forth, for controlling operations of computing device 200. In a specific embodiment, a local memory 201 (such as non-volatile random access memory (RAM) and/or read-only memory (ROM), including for example one or more levels of cached memory) may also form part of CPU 202. However, there are many different ways in which memory may be coupled to system 200. Memory 201 may be used for a variety of purposes such as, for example, caching and/or storing data, programming instructions, and the like. It should be further appreciated that CPU 202 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, a graphics processing unit (GPU), or a microprocessor, but broadly refers to a microcontroller, a microcomputer, a programmable logic controller, an application-specific integrated circuit, and any other programmable circuit.

In one embodiment, interfaces 210 are provided as network interface cards (NICs). Generally, NICs control the sending and receiving of data packets over a computer network; other types of interfaces 210 may for example support other peripherals used with computing device 200. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 210 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2 illustrates one specific architecture for a computing device 200 for implementing one or more of the inventions described herein, it is by no means the only device architecture on which at least a portion of the features and techniques described herein may be implemented. For example, architectures having one or any number of processors 203 may be used, and such processors 203 may be present in a single device or distributed among any number of devices. In one embodiment, a single processor 203 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 201) configured to store data, program instructions for the general-purpose network operations, or other information relating to the functionality of the embodiments described herein (or any combinations of the above). Program instructions may control execution of or comprise an operating system and/or one or more applications, for example. Memory 220 or memories 201, 220 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
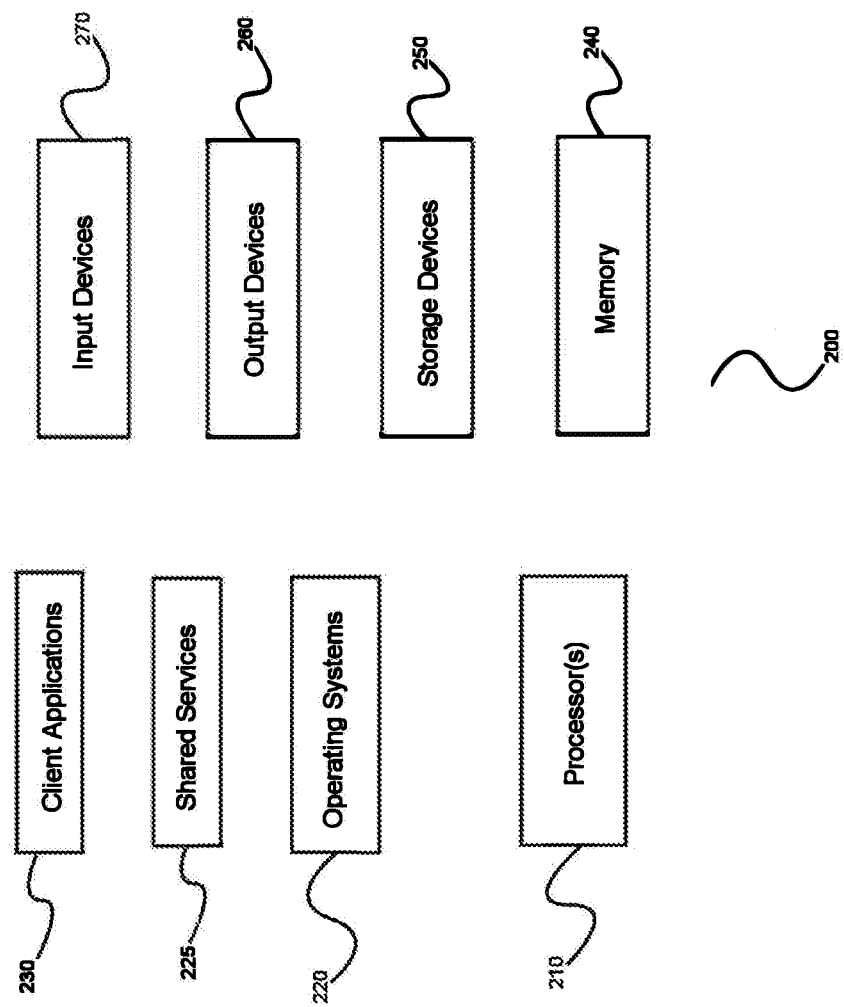
FIG. 3 is a block diagram illustrating an exemplary logical architecture for a client device, according to an embodiment of the invention.

In some embodiments, systems according to the present invention may be implemented on a standalone computing system. Referring now to FIG. 3, there is shown a block diagram depicting a typical exemplary architecture of one or more embodiments or components thereof on a standalone computing system. Computing device 300 includes processors 310 that may run software that carry out one or more functions or applications of embodiments of the invention, such as for example a client application 330. Processors 310 may carry out computing instructions under control of an operating system 320 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 325 may be operable in system 300, and may be useful for providing common services to client applications 330. Services 325 may for example be WINDOWS™ services, user-space common services in a Linux environment, or any other type of common service architecture used with operating system 310. Input devices 370 may be of any type suitable for receiving user input, including for example a keyboard, touchscreen, microphone (for example, for voice input), mouse, touchpad, trackball, or any combination thereof. Output devices 360 may be of any type suitable for providing output to one or more users, whether remote or local to system 300, and may include for example one or more screens for visual output, speakers, printers, or any combination thereof. Memory 340 may be random-access memory having any structure and architecture known in the art, for use by processors 310, for example to run software. Storage devices 350 may be any magnetic, optical, mechanical, memristor, or electrical storage device for storage of data in digital form (such as those described above, referring to FIG. 2). Examples of storage devices 350 include flash memory, magnetic hard drive, CD-ROM, and/or the like.

Figure 4:
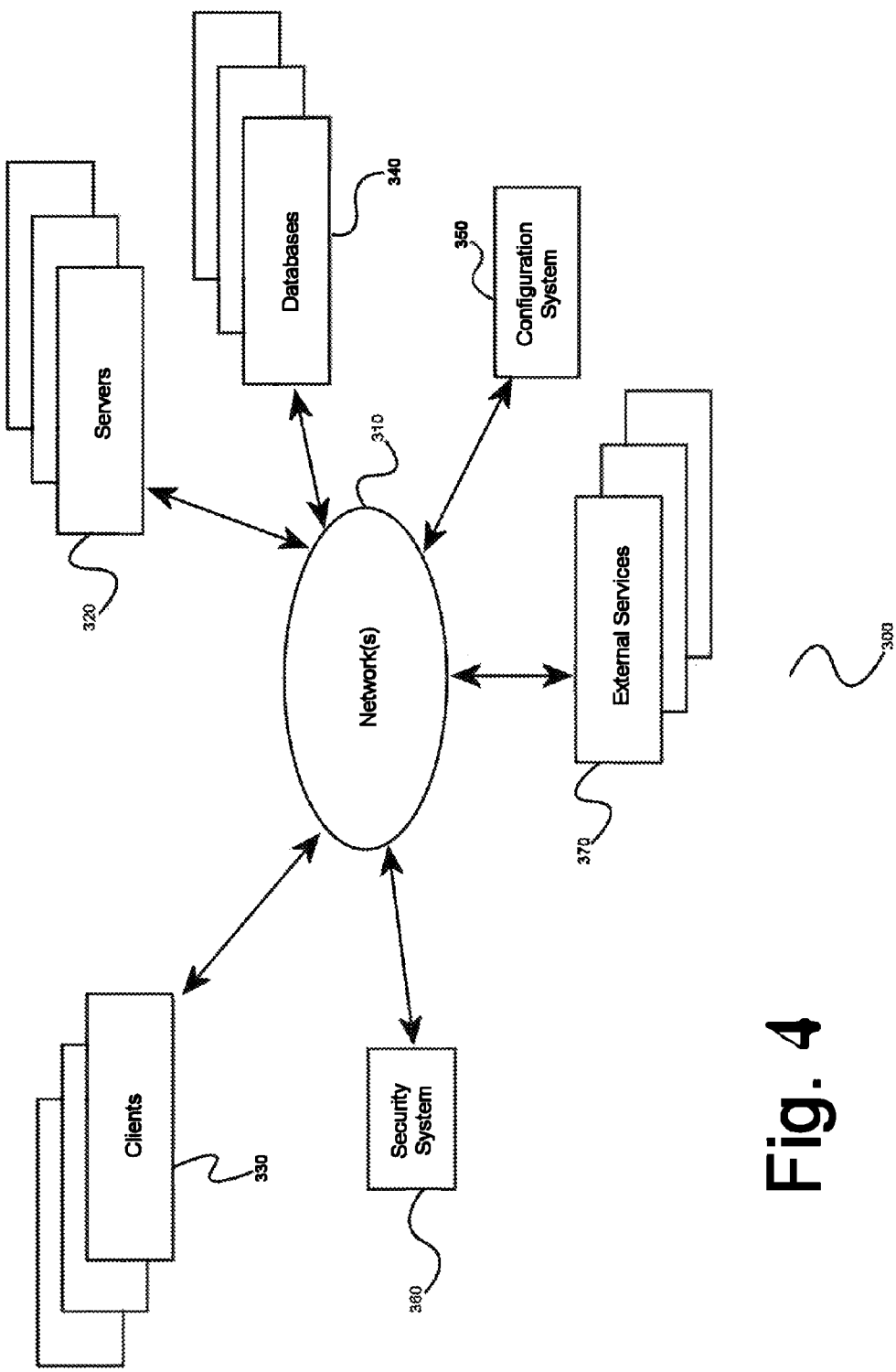
FIG. 4 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 4, there is shown a block diagram depicting an exemplary architecture 400 for implementing at least a portion of a system according to an embodiment of the invention on a distributed computing network. According to the embodiment, any number of clients 430 may be provided. Each client 430 may run software for implementing client-side portions of the present invention; clients may comprise a system 300 such as that illustrated in FIG. 3. In addition, any number of servers 420 may be provided for handling requests received from one or more clients 430. Clients 430 and servers 420 may communicate with one another via one or more electronic networks 410, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 410 may be implemented using any known network protocols, including for example wired and/or wireless protocols.

In addition, in some embodiments, servers 420 may call external services 470 when needed to obtain additional information, or to refer to additional data concerning a particular call. Communications with external services 470 may take place, for example, via one or more networks 410. In various embodiments, external services 470 may comprise web-enabled services or functionality related to or installed on the hardware device itself. For example, in an embodiment where client applications 430 are implemented on a smartphone or other electronic device, client applications 430 may obtain information stored in a server system 420 in the cloud or on an external service 470 deployed on one or more of a particular enterprise's or user's premises.

In some embodiments of the invention, clients 430 or servers 420 (or both) may make use of one or more specialized services or appliances that may be deployed locally or remotely across one or more networks 410. For example, one or more databases 440 may be used or referred to by one or more embodiments of the invention. It should be understood by one having ordinary skill in the art that databases 440 may be arranged in a wide variety of architectures and using a wide variety of data access and manipulation means. For example, in various embodiments one or more databases 440 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 460 and configuration systems 450. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 460 or configuration system 450 or approach is specifically required by the description of any specific embodiment.

Figure 5:
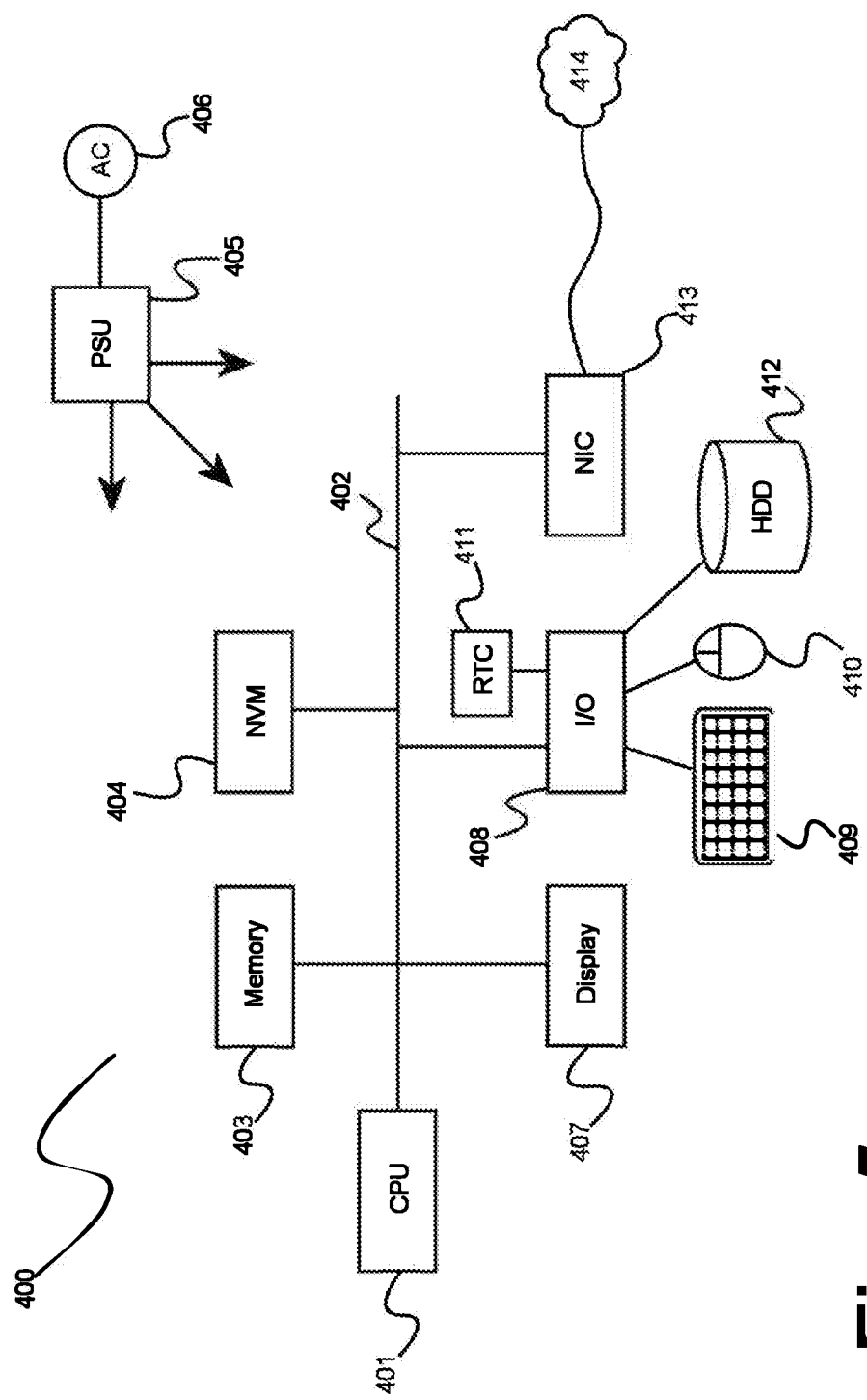
FIG. 5 is another block diagram illustrating an exemplary hardware architecture of a computing device used in various embodiments of the invention.

FIG. 5 shows an exemplary overview of a computer system 500 as may be used in any of the various locations throughout the system. It is exemplary of any computer that may execute code to process data. Various modifications and changes may be made to computer system 500 without departing from the broader scope of the system and method disclosed herein. CPU 501 is connected to bus 502, to which bus is also connected memory 503, nonvolatile memory 504, display 507, I/O unit 508, and network interface card (NIC) 513. I/O unit 508 may, typically, be connected to keyboard 509, pointing device 510, hard disk 512, and real-time clock 511. NIC 513 connects to network 514, which may be the Internet or a local network, which local network may or may not have connections to the Internet. Also shown as part of system 500 is power supply unit 505 connected, in this example, to ac supply 506. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components. In the final step of determining whether one of the at least one unknown speakers is identical with the at least one target speaker based on the at least one comparison result it is to be understood that identity of the unknown speaker and the target speaker is determined when the comparison result shows that the combined extracted speaker information and the stored speaker information for the target speaker are similar enough within predetermined limits. If the similarity is above some predetermined threshold, for example, it is determined that the unknown speaker and the target speaker are identical.

The speaker information for at least one target speaker (known speaker) is obtained, for example by speaker enrolment, as it is known in the art. The speaker information for the at least one target speaker can be obtained by obtaining a plurality of speech samples of the at least one target speaker. At least one of the plurality of speech samples of the at least one target speaker may be obtained from a telephone call of the at least one target speaker or at least some of the plurality of speech samples of the at least one target speaker are obtained from a plurality (at least two) telephone calls. Particularly, the speaker information for at least one target speaker can be obtained from either isolated words or continuous speech captured by a microphone or a telephone, for example, and converted to analogue electronic signals that subsequently are digitalized. Particularly, classifying the speech samples according to the at least one unknown speaker can be based on features (feature vectors) obtained by a feature analysis of the speech samples.

The digital signals can be subject to a subsequent spectral analysis. Recent representations of the speech waveforms sampled typically at a rate between 6.6 kHz and 20 kHz are derived from the short term power spectra and represent a sequence of characterizing vectors containing values of what is generally referred to as features/feature parameters. Then, a Gaussian Mixture Model (Gaussian Mixed Model) comprising a Gaussian density distribution of the generated feature vectors can be established that represents the elements of utterances of the at least one target speaker, i.e. phonemes, syllables, words, etc. Both the combined extracted speaker information for each of the speaker dependent classes of speech samples and the stored speaker information for the at least one target speaker may comprise information represented by Gaussian Mixture Models.

It is an object of the present invention to determine whether an incoming telephone call is made by a speaker that subsequently can be identified as the at least one target speaker. Different from conventional approaches according to the present invention, a plurality of speech samples from a plurality of telephone calls from at least one unknown speaker (that may or may not be different from the at least one target speaker) is obtained and classified (grouped) in order to achieve speaker-dependent classes of the speech samples such that the speech samples of each of the unknown speakers are respectively assigned to a particular class.

If speech sample of only one unknown speaker are considered, only one class of speech samples is derived. However, it is a plurality of speech samples of the at least one unknown speaker that is used to extract speaker information for the at least one unknown speaker. To be more definite for at least a number of the speech samples of one class speaker information is extracted and subsequently combined and it is the combined extracted speaker information of a class that is compared with the stored speaker information of the at least one target speaker. When a number r of speech samples of at least one unknown speaker is obtained it might be preferred to combine speaker information extracted from these speech samples in a weighted manner. For instance, speaker information obtained from s<r speech samples of at least a predetermined minimum overall quality and/or predetermined minimum duration and or predetermined minimum signal-to-noise level may be given higher weights than speaker information obtained from t=r−s speech samples that do not exhibit the respective minimum level(s).

For example, combining the extracted speaker information for each of the speaker dependent classes of speech samples may comprise generating for a particular class a combined Gaussian Mixture Model from the extracted speaker information of the speech samples of that class. According to an example of the inventive method, the combined Gaussian Mixture Model is generated from individual Gaussian Mixture Models obtained for the speech samples of that class, in particular, from Gaussian Mixture Models where in each of these Models is obtained for one of the speech samples (see also description of FIG. 1 below). In another embodiment where the i-vector paradigm is used, one can combine corresponding i-vectors. Effectively, one i-vector may be extracted for each of the speaker dependent classes of speech samples and to combine all the information of all speech samples from the same speaker dependent class. One could then combine all the corresponding i-vectors, by computing the mean, for example. If we create a new claim for that, we would need to include the corresponding information in the body.

According to another advantageous example the combined speaker information is achieved by combining feature vectors comprising some hundred features (e.g. more than 100 or 200 and/or less than 300 or 400 features), e.g., obtained by a feature analysis of one speech sample of a speaker and feature vectors obtained by a feature analysis of another speech sample of the same speaker. For example, the combined speaker information may be generated by vector summation of feature vectors obtained from the one speech sample of the same speaker and feature vectors obtained from the other speech sample of the same speaker. The summation may be performed for pairs of feature vectors respectively comprising one feature vector obtained from the one speech sample and one feature vector obtained from the other speech sample of the same speaker, in particular, where the two feature vectors are close to each other within some predetermined limits. The combined speaker information, in this case, is obtained based on the respective resulting feature vectors. Particularly, the above-mentioned comparison result may be obtained based on scalar products of the resulting feature vectors representing the combined speaker information and feature vectors representing target speaker information.

In view of the above, for each class of speech samples obtained by classifying the speech samples of the incoming telephone calls according to the at least one unknown speaker a single grade of similarity with the stored speaker information of the at least one target speaker can be obtained by comparing the combined extracted speaker information for each of the speaker-dependent classes of speech samples with the stored speaker information for the at least one target speaker.

In the art, a single incoming telephone call is analyzed for speaker information of an unknown speaker making the telephone call and the thus obtained speaker information is compared with stored speaker information of a target speaker. Since in the present invention a number of speech samples obtained by a number of telephone calls (at least two telephone calls) are used to derive speaker information for the unknown speaker making these telephone calls and the combined extracted speaker information for that unknown speaker is used for the matching process with the stored target speaker information, an unprecedented accuracy of speaker recognition can be achieved.

According to an example the inventive method comprises grouping of the telephone calls according to the telephone numbers of the telephone calls before classifying the speech samples according to the at least one unknown speaker. The process of grouping according to the telephone numbers can accelerate the process of classification according to the at least one unknown speaker.

For instance, pre-classification may be performed for individual groups of speech samples of the respective same telephone numbers and subsequently classification according to the unknown speakers can be performed based on the pre-classification. In this case, a number t of u speech samples obtained for a telephone number a may be pre-classified to belong to a particular unknown speaker and a number v of w speech samples obtained for a different telephone number b may be pre-classified to belong to the same particular unknown speaker and, then, all samples t+v can be classified to belong to a single class corresponding to that unknown speaker.

However, in order to avoid insensitivity against usage of a particular number by more than one speaker, the classification according to the at least one unknown speaker shall advantageously not be made for each group obtained by grouping according to the telephone number separately. If this was done, errors due to the implicit assumption that a single speaker uses a specific telephone number only might occur. Rather, classification shall be performed for all telephone numbers.

Other filters different from grouping according to the telephone numbers, for example, grouping according to the date or time of the telephone calls and/or the place from where and to where the calls are made may be alternatively or additionally applied.

According to an example of the inventive method, the speech samples according to the at least one unknown speaker are classified by a speaker clustering technique. The speaker clustering technique may be based on a Gaussian Mixture Model and a Gaussian Mixture Model metric. The metric may be based on distance measures know in the art, for example, a Euclidean distance, the Mahalanobis distance or the Kullback-Leibler distance.

Speech samples are classified to belong to the same class, if the respective distance measure to other samples of the class is below some predetermined threshold. Moreover, Agglomerative Hierarchical Clustering can be used for the classification of unknown speakers. Agglomerative Hierarchical Clustering is known in the art per se and is based on a tree-like data structuring wherein nodes describe a group of observations that are characteristic for a particular class of data.

Classes described in parent nodes are determined by merging the characteristics defined in the corresponding child nodes. In order to effectively stop the recursive clustering process when the clustering error rate is minimum a the Baye's information criterion might be employed that checks whether or not the closest pairs of clusters are homogeneous in terms of speaker identity before every merging by quantifying a statistical distance between the clusters. Clusters are regarded as being homogeneous, if the statistical distance is less that a predetermined threshold. Other criterions that might be employed are the Information Change Rate and the Generalized Likelihood Ratio.

In order to reduce channel effects, in some embodiments a Joint Factor Analysis may be employed (for details, see for example, S.-C. Yin, R. Rose and P. Kenny, "A Joint Factor Analysis Approach to Progressive Model Adaptation in Text-Independent Speaker Verification", IEEE Transactions on Audio, Speech and Language Processing, Vol. 15, 7, 2007 Aug. 20, pages 1999-2010). In other embodiments, an i-vector paradigm may be used (for details, see N. Dehak, P. J. Kenny, R. Dehak, P. Dumouchel and P. Oullet, "Front-End Factor Analysis for Spaker Verification", IEEE Tans. On Audio, Speech and Language processing, vol 19, No 4, May 2011).

The present invention also provides a computer program product comprising one or more computer readable media having computer-executable instructions for performing steps of the method for speaker recognition according to one of the above-described examples when run on a computer.

Furthermore, in order to address the above-mentioned object it is provided a speaker recognition means, comprising:
 a database configured to store speaker information for a target speaker;
 means configured to classify speech samples of telephone calls according to at least one unknown speaker thereby providing one, two or more speaker-dependent classes of speech samples;
 means to extract speaker information for the speech samples of each of the speaker dependent classes of speech samples;
 means configured to combine the extracted speaker information for each of the speaker-dependent classes of speech samples;

means configured to compare the combined extracted speaker information for each of the speaker-dependent classes of speech samples with the stored speaker information for the at least one target speaker to obtain at least one comparison result; and means configured to determine whether one of the at least one unknown speakers is identical with the at least one target speaker based on the at least one comparison result.

Additionally, the speaker recognition means may comprise means configured to receive telephone calls from at least one unknown speaker. The speaker recognition means may further comprise means configured to group the telephone calls according to the telephone numbers of the telephone calls, in particular, before the telephone calls are processed by the means configured to classify the speech samples.

The speaker recognition means may be configured to perform any of the steps of the above-described examples of the inventive method.

Additional features and advantages of the present invention will be described with reference to the drawing. In the description, reference is made to the accompanying figure that is meant to illustrate an example of the invention. It is understood that such an example does not represent the full scope of the invention.

FIG. 1 illustrates an example of the inventive method of speaker recognition comprising speaker clustering and combination of speaker information from individual speech samples or segments.

As shown in FIG. 1, according to an example of the herein disclosed method for speaker recognition incoming telephone calls are grouped, in step 101, according to the respective telephone numbers of the calls. Speech samples/segments obtained from telephone calls with a telephone number 1 102a are grouped in a group 1, speech samples I segments obtained from telephone calls with a telephone number 2 are grouped in a group 2 and so forth up to group N consisting of telephone calls with a telephone number N 101n. In a next step 102 speaker clustering is performed. For example, speaker clustering based on Agglomerative Hierarchical Clustering as mentioned above can be performed in order to achieve N classes wherein (ideally) each of the classes includes speech samples 1 segments 103a from one of K unknown speakers 103n only.

It is of importance that according to the present invention a plurality of speech samples/segments is considered for an unknown speaker that is to be identified against one or more target speakers the speaker information of which is stored beforehand. The plurality of speech samples/segments is processed by a module for the combination 103, 113 of the speaker information for each of the classes into which the speech samples have been classified during speaker clustering.

It may be preferred that speaker information obtained during the speaker clustering, for example, spectral envelopes, pitches, MEL frequency cepstral coefficients, etc., of individual unknown speakers, are used by the module for the combination 103, 113 of the speaker information. Alternatively, new speaker information is generated by this module. The output of this module represents combined speaker information for each of the unknown speaker K separately. The speaker information is biometric information 111c for unknown speakers 1 111a to K 111n uniquely representing verbal utterances by these speakers. In particular, the biometric information can be generated in form of Gaussian Mixture Models as mentioned above.

For example, speech samples classified to correspond to an unknown speaker 1 are processed for feature analysis. Based on a speech sample from one telephone call a Gaussian Mixture Model is generated. Then, from another speech sample from another telephone call that is also classified to correspond to the same unknown speaker 1 another Gaussian Mixture Model is generated. Subsequently, a combined Gaussian Mixture Model is generated from the Gaussian Mixture Model generated on the basis of the speech sample of the one telephone call and the other Gaussian Mixture Model generated on the basis of the other speech sample of the other telephone call.

Consider feature vectors representing Gaussians within a Gaussian Mixture Model for the one speech sample from one telephone call. This Gaussian Mixture Model may be supplemented by feature vectors of the other Gaussian Mixture Model generated on the basis of the other speech sample of the other telephone call. Additionally or alternatively when one feature vector of one Gaussian Mixture Model is close to another feature vector of another Gaussian Mixture Model within a predetermined limit, a feature vector of the combined Gaussian Mixture Model may be generated by some average of the two feature vectors of the one and the other Gaussian Mixture Model. The distances between the feature vectors, in principle, could be determined by distance measures known in the art, e.g., some Euclidean distance, the Mahalanobis distance or the Kullback-Leibler distance. The distances between the feature vectors may also be determined based on scalar products of these feature vectors.

The combination of speaker information may, alternatively, be based on a direct combination of feature vectors from one or more first speech samples of an unknown speaker and feature vectors of one or more speech samples of the same unknown speaker wherein combination may comprises summation of feature vectors to generate resulting feature vectors representative for the combined speaker information. Again, resulting feature vectors may result from the summation of two or more feature vectors that are close to each other within predetermined limits. Moreover, summation may be a weighted summation wherein the weights are selected according to a predetermined minimum overall quality and/or predetermined minimum duration and or predetermined minimum signal-to-noise level.

According to the example of the present invention shown in FIG. 1, the speaker information (biometric information) of speaker 1 to K are subject to voice biometric comparison in step 111 with speaker information obtained and stored for one or more target speakers. Again, some distance measure as mentioned-above may be employed during the comparison process. In particular, according to the present example a score is obtained for each of the speaker information corresponding to the unknown speaker 1 112a to K 112n. The scores measure similarity between the respective speaker information corresponding to the unknown speakers and the stored speaker information for a target speaker.

The outcomes of the voice biometric comparison can be rank ordered in decision step 112 and N-best lists can be generated based on the rank-ordered outcomes. The speaker information of an unknown speaker that best matches the stored speaker information of a target speaker is determined and the corresponding unknown speaker is identified as the target speaker when the degree of matching is above a predetermined threshold, for example. Moreover, text-independent recognition processing may be supplemented by text-dependent recognition processing, in general. For this purpose, code books based on Gaussian Mixture Models may be employed as it is known in the art.

According to a further embodiment of the invention, one may optionally filter the input segments using an external filter in step 114, using filters such as telephone number, telephone or caller location, or call times. After that, the method continues with grouping of segments in step 101 and speaker clustering 102 to get several speaker-dependent classes. After that, we combine 103, 113 the biometric information of all the audios that belong to the same speaker-dependent class, we compare in step 111 the fused information with biometric information 111c of target speaker(s) and finally we take a decision 112. Now, we can complete the system by including a feedback loop. Once we have decided that a set of audios (that is, a speaker-dependent class) corresponds to a target speaker, we can use those audios (those belong to the speaker-dependent class) to adapt the biometric target speaker information in step 115, by combination, as was previously explained. Thus, biometric information of target speaker is much more robust and better results will be reached every time. Note that not only biometric information may be adapted, but also external filters (in step 114). These adapted filters may then be used in step 101 and the adapted biometric information may be used in step 111. For example, if we detected that a target speaker used an unknown telephone number, we can link the target speaker to the new telephone number.

It should be stated that according to the above-described invention and contrary to the art, speaker recognition/identification is based on more than one telephone call from an unknown speaker. The speech samples of these telephone calls are used to determine whether or not the unknown speaker is identical with a target speaker whose biometric information has previously been obtained and stored for comparison purposes. By using the (classified) speech sample of the unknown speaker for the matching process accuracy and reliability of speaker recognition/identification can significantly be enhanced as compared to the art.

All previously discussed embodiments are not intended as limitations but serve as examples illustrating features and advantages of the invention. It is to be understood that some or all of the above described features can be combined in different ways. The skilled person will be aware of a range of possible modifications of the various embodiments described above. Accordingly, the present invention is defined by the claims and their equivalents.

What is claimed is:

1. A method for speaker recognition, comprising:
a speaker recognition computer comprising a database, computer readable media, and computer-executable instructions, the instructions stored on the computer-readable media operating on the computer and configured to perform the steps of:
retrieving, from the database, digitalized speaker information for a target speaker;
obtaining a plurality of digital speech samples from a plurality of unknown speakers;
classifying, the plurality of digital speech samples according to the plurality of unknown speakers thereby providing a plurality of speaker-dependent classes of digital speech samples;
extracting, digitalized speaker information for the digital speech samples of each of the speaker-dependent classes of digital speech samples;
combining, the extracted digitalized speaker information for each of the speaker-dependent classes of digital speech samples;
comparing, the combined extracted digitalized speaker information for each of the speaker-dependent classes of digital speech samples with the retrieved digitalized speaker information for the target speaker to obtain at least one comparison result; and
determining, whether one of the plurality of unknown speakers is the target speaker based on at least one comparison result;
wherein combining the extracted digitalized speaker information for each of the speaker-dependent classes of digital speech samples comprises combining feature vectors obtained for one or more digital speech samples of a speaker-dependent class with feature vectors of one or more other digital speech samples of the same speaker-dependent class, in particular, by summation of at least some of the feature vectors, more particularly, comprising adding a feature vector of one speech sample of the speaker-dependent class and another feature vector of another speech sample of the speaker-dependent class, if they are close to each other within predetermined limits;
wherein the summation is a weighted summation wherein the weights are selected from the group consisting of a predetermined minimum overall quality, a predetermined minimum duration, and a predetermined minimum signal-to-noise level.

2. The method of claim 1, further comprising the step of:
grouping of the digital speech samples associated to the plurality of unknown speakers according to one of a set of filters comprising:
a set of telephone numbers associated to the digital speech samples,
a set of dates or times associated to the digital speech samples, and
a set of places associated to the digital speech samples.

3. The method of claim 1, wherein the digitalized speaker information for the target speaker is obtained by obtaining a plurality of digital speech samples of the target speaker.

4. The method of claim 3, wherein at least one of the plurality of digital speech samples of the target speaker is obtained from a telephone call of the target speaker.

5. The method of claim 4, wherein the digital speech samples associated to the unknown speaker are classified by a speaker clustering technique, in particular, by Agglomerative Hierarchical Clustering.

6. The method of claim 5, wherein the speaker clustering technique is based on a Gaussian Mixture Model and a Gaussian Mixture Model metric.

7. The method of claim 6, wherein the speaker clustering technique employs a Joint Factor Analysis or the i-vector paradigm.

8. The method of claim 6, wherein the combined Gaussian Mixture Model is generated from Gaussian Mixture Models of the digital speech samples of that class.

9. The method of claim 1, wherein combining the extracted digitalized speaker information for each of the speaker-dependent classes of digital speech samples comprises one of:
generating for a particular class a combined Gaussian Mixture Model from the extracted digitalized speaker information of the digital speech samples of that class; or
combining corresponding i-vectors, wherein one i-vector is extracted for each of the speaker dependent classes of digital speech samples and then combining all the corresponding i-vectors by computing a mean.

10. The method of claim 1, wherein the set of filters comprises an external filter.

11. The method of claim 1, further comprising the steps of:
adapting the digitalized speaker information for the target speaker, when the result of the determining step is that one of the digital speech samples associated to one of the plurality of unknown speakers is within a predetermined threshold of the digitalized speaker information associated to the target speaker based on at least one comparison result, by combining the digital speech samples associated to the unknown speaker that matches the digital speech samples associated to target speaker with the digitalized speaker information associated to the target speaker, thereby refining a speaker model for the target speaker, and
storing the refined speaker model in the database.

12. A system for performing speaker recognition, comprising:
a speaker recognition computer comprising a database, computer readable media, and computer-executable instructions, the instructions stored on the computer-readable media operating on the computer and configured to perform speaker recognition comprising:
the database to store digitalized speaker information associated to a target speaker;
computer-executable instructions configured to classify digital speech samples associated to a plurality of unknown speakers thereby providing a plurality of speaker-dependent classes of digital speech samples;
computer-executable instructions configured to extract digitalized speaker information for the digital speech samples of each of the speaker-dependent classes of digital speech samples;
computer-executable instructions configured to combine the extracted digitalized speaker information for each of the speaker-dependent classes of digital speech samples;
computer-executable instructions configured to compare the combined extracted digitalized speaker information for each of the speaker-dependent classes of digital speech samples with the stored digitalized speaker information associated to the target speaker to obtain at least one comparison result; and
computer-executable instructions configured to determine whether one of digital speech samples associated to one of the plurality of unknown speakers is within a predetermined threshold of the digitalized speaker information associated to the target speaker based on the at least one comparison result
wherein combining the extracted digitalized speaker information for each of the speaker-dependent classes of digital speech samples comprises combining feature vectors obtained for one or more digital speech samples of a speaker-dependent class with feature vectors of one or more other digital speech samples of the same speaker-dependent class by summation of at least some of the feature vectors comprising adding a feature vector of one speech sample of the speaker-dependent class and another feature vector of another speech sample of the speaker-dependent class, if they are close to each other within predetermined limits;
wherein the summation is a weighted summation wherein the weights are selected from the group consisting of a predetermined minimum overall quality, a predetermined minimum duration, and a predetermined minimum signal-to-noise level.

13. The system of claim 12, further comprising computer-executable instructions configured to receive digital speech samples via telephone calls from at least one unknown speaker.

14. The system of claim 12, further comprising computer-executable instructions configured to group the telephone calls according to the associated telephone numbers.

15. The system of claim 12, further wherein the digitalized speaker information for the target speaker is adapted, when the result of the determining step is that one of the digital speech samples associated to one of the plurality of unknown speakers is within a predetermined threshold of the digitalized speaker information associated to the target speaker based on at least one comparison result, by combining the digital speech samples associated to the unknown speaker that matches the digital speech samples associated to target speaker with the digitalized speaker information associated to the target speaker, thereby refining a speaker model for the target speaker, and storing the refined speaker model in the database.

* * * * *